US011886245B2

(12) United States Patent
Levine et al.

(10) Patent No.: US 11,886,245 B2
(45) Date of Patent: Jan. 30, 2024

(54) ESTIMATING RUNTIME-FRAME VELOCITY OF WEARABLE DEVICE

(71) Applicant: Microsoft Technology Licensing, LLC, Redmond, WA (US)

(72) Inventors: Evan Gregory Levine, Seattle, WA (US); Salim Sirtkaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 17/313,952

(22) Filed: May 6, 2021

(65) Prior Publication Data
US 2022/0365555 A1 Nov. 17, 2022

(51) Int. Cl.
*G06F 1/16* (2006.01)
*G06N 20/00* (2019.01)
(Continued)

(52) U.S. Cl.
CPC ........... *G06F 1/163* (2013.01); *G01C 25/005* (2013.01); *G06F 1/1658* (2013.01);
(Continued)

(58) Field of Classification Search
CPC ...... G06V 10/24; G06V 20/20; G01C 21/165; G01C 21/206; G01C 25/005;
(Continued)

(56) References Cited

U.S. PATENT DOCUMENTS 10,182,746 B1 1/2019 Demiralp et al.
2019/0038187 A1* 2/2019 Latella, Jr. ............ G06F 3/0346
(Continued)

FOREIGN PATENT DOCUMENTS

WO 2020074921 A1 4/2020

OTHER PUBLICATIONS

Liu, et al., "TLIO: Tight Learned Inertial Odometry", In Journal of IEEE Robotics and Automation Letters, vol. 5, Issue 4, Oct. 2020, pp. 5653-5660.
(Continued)

*Primary Examiner* — Xilin Guo
(74) *Attorney, Agent, or Firm* — Alleman Hall Creasman & Tuttle LLP

(57) ABSTRACT

A wearable computing device, including a device body configured to be affixed to a body of a user. The wearable computing device may further include an inertial measurement unit (IMU) and a processor. The processor may receive kinematic data from the IMU while the device body is affixed to the body of the user. The processor may perform a first coordinate transformation on the kinematic data into a training coordinate frame of a training wearable computing device. At a first machine learning model trained using training data including training kinematic data collected at the training wearable computing device, the processor may compute a training-frame velocity estimate for the wearable computing device based on the transformed kinematic data. The processor may perform a second coordinate transformation on the training-frame velocity estimate to obtain a runtime-frame velocity estimate and may output the runtime-frame velocity estimate to a target program.

20 Claims, 12 Drawing Sheets

(51) Int. Cl.
  *G01C 25/00*     (2006.01)
  *G06F 18/214*    (2023.01)
  *G06F 18/21*     (2023.01)

(52) U.S. Cl.
  CPC .......... *G06F 18/214* (2023.01); *G06F 18/217* (2023.01); *G06N 20/00* (2019.01)

(58) Field of Classification Search
  CPC ............ G02B 27/0093; G02B 27/0172; G02B 2027/0138; G02B 2027/0178; G06F 3/011; G06F 1/163; G06F 18/214; G06F 1/1658; G06F 18/217; G06N 3/08; G06N 20/00; G06N 3/044
  See application file for complete search history.

(56) References Cited

U.S. PATENT DOCUMENTS

| | | | |
|---|---|---|---|
| 2020/0072690 A1* | 3/2020 | Mariani | A43B 5/14 |
| 2020/0258365 A1* | 8/2020 | Ten Kate | G08B 21/0446 |
| 2021/0118218 A1* | 4/2021 | Huang | G01C 19/00 |
| 2021/0223858 A1* | 7/2021 | Barak | A63F 13/428 |
| 2021/0254979 A1* | 8/2021 | Faragher | G01C 21/20 |

OTHER PUBLICATIONS

"International Search Report and Written Opinion Issued in PCT Application No. PCT/US22/024142", dated Jul. 11, 2022, 11 Pages.

* cited by examiner

ESTIMATING RUNTIME-FRAME VELOCITY OF WEARABLE DEVICE

BACKGROUND

Pose estimation is frequently performed during use of wearable computing devices. The pose of a wearable computing device includes the position and angular orientation of the wearable computing device in space. When the pose of a wearable computing device is estimated, the pose may be used as an input for various computing processes. For example, when the wearable computing device includes a display, the wearable computing device may utilize pose data to determine the positions of content items that are displayed to the user. As another example, the wearable computing device may use the position and angular orientation of the device as inputs for a navigation application program.

SUMMARY

According to one aspect of the present disclosure, a wearable computing device is provided, including a device body configured to be affixed to a body of a user. The wearable computing device may further include an inertial measurement unit (IMU) including an accelerometer and a gyroscope coupled to the device body at a first IMU mounting location. The wearable computing device may further include a processor electronically coupled to the IMU. The processor may be configured to receive kinematic data from the IMU while the device body is affixed to the body of the user. The kinematic data may be in a runtime coordinate frame. The processor may be further configured to perform a first coordinate transformation on the kinematic data from the runtime coordinate frame into a training coordinate frame of a training wearable computing device to obtain transformed kinematic data. The training wearable computing device may have a second device body with a second IMU mounting location that differs from the first IMU mounting location. At a first machine learning model trained using training data including training kinematic data collected at a training IMU of the training wearable computing device, the processor may be further configured to compute a training-frame velocity estimate for the wearable computing device based at least in part on the transformed kinematic data. The processor may be further configured to perform a second coordinate transformation on the training-frame velocity estimate from the training coordinate frame into the runtime coordinate frame to obtain a runtime-frame velocity estimate for the wearable computing device. The processor may be further configured to output the runtime-frame velocity estimate to a target program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Pose estimation for a wearable computing device is frequently performed using imaging data of the environment surrounding the wearable computing device. Simultaneous localization and mapping (SLAM) may be performed on the imaging data in order to estimate the position and angular orientation of the wearable computing device relative to its surroundings. Pose estimation may additionally or alternatively be performed using Global Positioning System (GPS) data that indicates the location of the wearable computing device. However, the wearable computing device may be unable to obtain accurate GPS data and imaging data in some scenarios. In such scenarios, an inertial measurement unit (IMU) included in the wearable computing device may be used to perform inertial odometry (also referred to as dead reckoning) for the wearable computing device. Inertial odometry may include estimating the pose of the wearable computing device based on measurements received from the IMU.

When inertial odometry is performed, drift between the estimated pose of the wearable computing device and the true pose of the wearable computing device may occur. This drift may increase super-linearly over time. In order to reduce pose drift, a machine learning model may be used to estimate the pose of the wearable computing device from the IMU measurements. Using a machine learning model to perform inertial odometry may result in significant increases in pose estimation accuracy over alternative approaches.

It will be appreciated if a machine learning model is trained to estimate a pose of a wearable computing device from IMU measurements, the model typically will be specific to the particular device from which the IMU measurements are received, since the relationship between the IMU signals and pose will be specific to the physical configuration of the wearable computing device that is used during training, and in particular to the position of the IUs within the wearable computing device, relative to the user's body. A challenge to development of such machine learning models is that significant resources must be devoted to the development and training of a separate machine learning model for each different configuration of wearable computing device that a manufacturer develops, which can be cost prohibitive. Conversely, since machine learning models for performing inertial odometry may be expensive to train, any changes in the physical configuration of a wearable computing device in a new version of the device may incur high costs associated with retraining the inertial odometry machine learning model for the updated physical configuration of the wearable computing device.

Figure 1A:
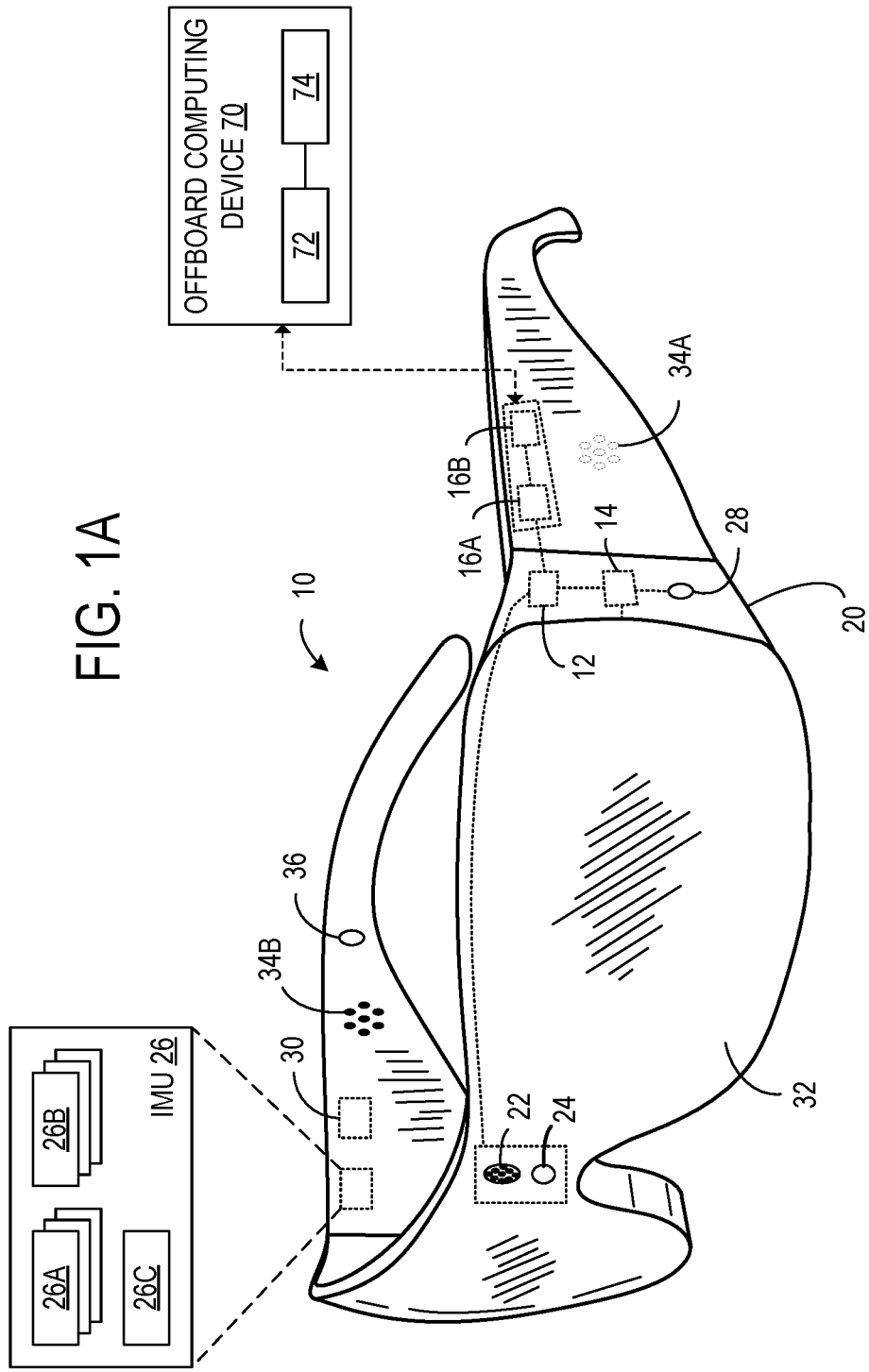
FIG. 1A shows an example wearable computing device in the form of a head-mounted display device configured to present a mixed-reality environment, according to one example embodiment.
Figure 1B:
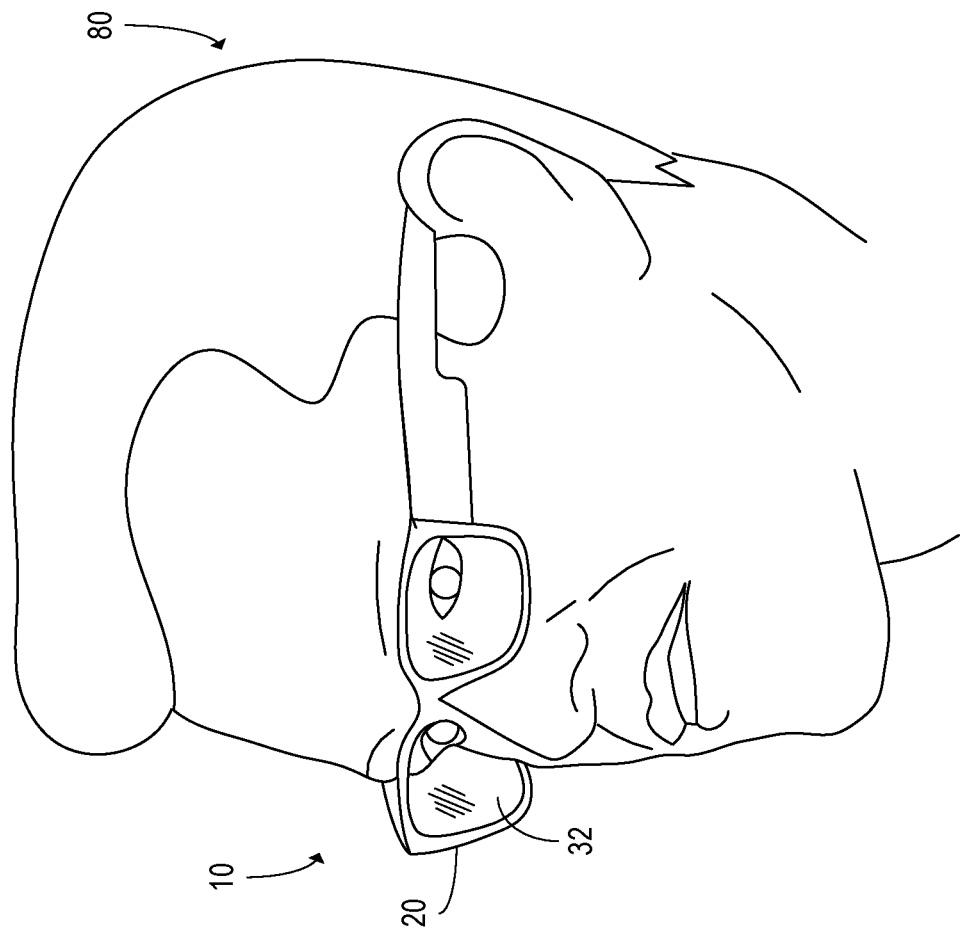
FIG. 1B shows the wearable computing device of FIG. 1A when a device body of the wearable computing device is affixed to the body of a user.
Figure 1B:
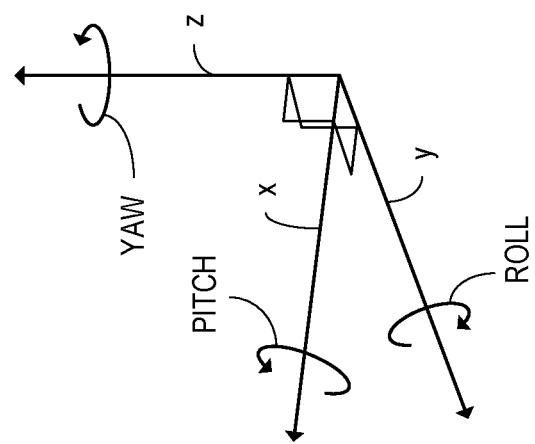

In order to address the above challenges, a wearable computing device 10 is provided, as shown in the example of FIG. 1A. In the example of FIG. 1A, the wearable computing device 10 is a head-mounted display (HMID) device configured to present a mixed-reality environment. The wearable computing device 10 may include a device body 20 configured to be affixed to a body of a user 80, as shown in the example of FIG. 1B. As depicted in the example of FIG. 1B, the device body 20 may be a frame that holds a display 32, which takes the form of a near-eye display in this example, close to the user's eyes. Returning to FIG. 1A, the device body 20 may support additional components of the wearable computing device 10, such as, for example, a processor 12 and memory 14. The processor 12 may be operatively coupled to the memory 14 and may be configured to provide image signals to the display 32, to receive sensor data from input devices, and to enact various control processes.

In some examples, the wearable computing device 10 may further include a communication device suite, which may include a receiver 16A and a transmitter 16B. The receiver 16A and the transmitter 16B may be respectively configured to receive and transmit wireless communication signals. Via the receiver 16A and the transmitter 16B, respectively, the processor 12 may be configured to receive data from, and transmit data to, an offboard computing device 70. The offboard computing device 70 may include an offboard device processor 72 that is communicatively coupled to offboard device memory 74. The offboard computing device 70 may, for example, be configured to perform computations on the data received from the wearable computing device 10 and to transmit the results of those computations to the wearable computing device 10. Thus, computationally expensive tasks may be offloaded to the offboard computing device 70 by the processor 12. In another example, the wearable computing device 10 may be networked with one or more other wearable computing devices via the receiver 16A and the transmitter 16B.

The display 32 may be configured to enable the user 80 of the wearable computing device 10 to view physical, real-world objects in the physical environment through one or more partially transparent pixels displaying virtual object representations. Thus, the physical objects and the virtual object representations may both be included in a mixed-reality environment. The display 32 may include image-producing elements such as, for example, a see-through Organic Light-Emitting Diode (OLED) display. As another example, the wearable computing device 10 may include a light modulator on an edge of the display 32. In this example, the display 32 may serve as a light guide for delivering light from the light modulator to the eyes of the user 80. In other examples, the display 32 may utilize a liquid crystal on silicon (LCOS) display.

In addition to the display 32, the wearable computing device 10 may further include one or more output devices. In the example of FIG. 1A, the wearable computing device 10 includes a left speaker 34A and a right speaker 34B configured to output sound. The left speaker 34A and the right speaker 34B may be positioned to be near the user's left ear and right ear respectively when worn. Thus, the wearable computing device 10 may be configured to produce stereo sound outputs via the left speaker 34A and the right speaker 34B. The wearable computing device 10 may further include one or more haptic feedback devices 36 configured to produce touch output (e.g. vibration).

The wearable computing device 10 shown in FIG. 1A further includes a plurality of input devices, including various sensors and related systems to provide information to the processor 12. Such sensors may include an IMU 26 and a GPS receiver 30, as discussed in further detail below. The plurality of input devices may further include one or more imaging sensors, which may include one or more outward-facing imaging sensors 22 and one or more inward-facing imaging sensors 24. The one or more inward-facing imaging sensors 24 may be configured to acquire image data in the form of gaze tracking data from a wearer's eyes. The one or more outward-facing imaging sensors 22 may be configured to capture and/or measure physical environment attributes of the physical environment in which the wearable computing device 10 is located. In one example, the one or more outward-facing imaging sensors 22 may include a visible-light camera or RGB camera configured to collect a visible-light image of a physical space. Further, the one or more outward-facing imaging sensors 22 may include a depth camera configured to collect a depth image of a physical space. The depth camera may, for example, be an infrared time-of-flight depth camera. In another example, the depth camera may be an infrared structured light depth camera.

Data from outward-facing imaging sensors 22 may be used by the processor 12 to generate and/or update a three-dimensional (3D) model of the physical environment. The data from the outward-facing imaging sensors 22 may be used by the processor 12 to identify surfaces of the physical environment and/or measure one or more surface parameters of the physical environment. The processor 12 may be configured to execute instructions to generate or update virtual scenes displayed on display 32, identify surfaces of the physical environment, and recognize objects based on the identified surfaces in the physical environment. The position and orientation of the wearable computing device 10 relative to the physical environment may, for example, be assessed so that augmented-reality images may be accurately displayed in desired real-world locations with desired orientations. The 3D model of the physical environment may include surface reconstruction information, which may include a geometric representation, such as a geometric mesh, of the physical environment.

In examples in which a GPS receiver 30 is included in the wearable computing device 10, the GPS receiver may be configured to receive global positioning signals that indicate the position of the wearable computing device 10. For example, a global positioning signal may indicate a latitude and a longitude at which the wearable computing device 10 is located. The global positioning signals may, for example, be received from a GPS satellite.

The IMU 26 of the wearable computing device 10 may be configured to provide position and/or orientation data of the wearable computing device 10 to the processor 12. The IMU 26 may be coupled to the device body 20 at a first IMU mounting location, as discussed in further detail below. In one implementation, the IMU 26 may be configured as a six-degree of freedom (6DOF) position sensor system. Such a configuration may include three accelerometers 26A and three gyroscopes 26B to indicate or measure a change in location of the wearable computing device 10 along three orthogonal spatial axes (e.g., x, y, and z) and a change in device orientation about three orthogonal rotation axes (e.g., yaw, pitch, and roll). Coordinate axes indicating the x, y, z, yaw, pitch, and roll directions in the reference frame of the user 80 are shown in FIG. 1B. In some examples, the IMU 26 may further include one or more magnetometers 26C configured to measure a strength and direction of a magnetic field. The orientation derived from the sensor signals of the IMU 26 may be used to display, via the display 32, one or more holographic images with a realistic and stable position and orientation.

Figure 2:
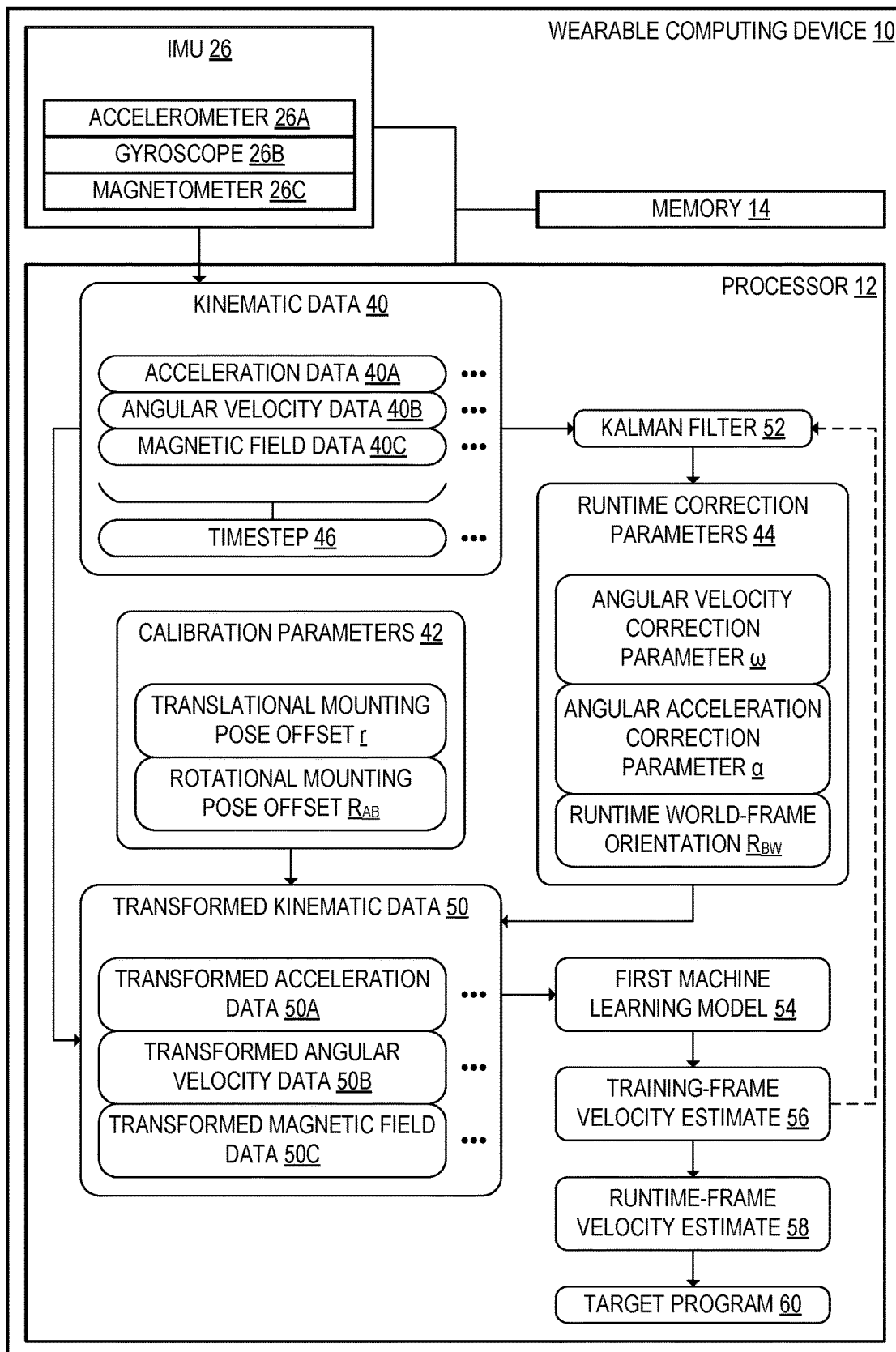
FIG. 2 schematically shows the wearable computing device of FIG. 1A when kinematic data is received at a processor.

FIG. 2 schematically shows the wearable computing device 10 of FIG. 1A at runtime while the device body 20 is affixed to the body of the user 80, according to one example. As shown in the example of FIG. 2, the processor 12 may be configured to receive kinematic data 40 from the IMU 26. The kinematic data 40 may, for example, include acceleration data 40A received from an accelerometer and angular velocity data 40B received from a gyroscope 26B. In some examples, the kinematic data 40 may further include magnetic field data 40C received from a magnetometer 26C. The acceleration data 40A, the angular velocity data 40B, and the magnetic field data 40C may be collected at respective sampling frequencies and may be processed as time series data. Thus, the values included in the kinematic data 40 may be associated with corresponding timesteps 46 in which the processor 12 receives the kinematic data 40. In some examples, the kinematic data 40 may be stored in a kinematic data buffer in the memory 14.

The processor 12 may receive the acceleration data 40A, the angular velocity data 40B, and the magnetic field data 40C as quantities from which an acceleration rate, and angular velocity, and a magnetic field strength for the wearable computing device 10 may be computed, rather than as the values of the acceleration rate, angular velocity, and magnetic field strength themselves. The relationships between the acceleration data 40A, the angular velocity data 40B, the angular acceleration, and the angular velocity may be expressed by the following equations. The equations below are provided for an IMU A, which may be a training IMU of a training wearable computing device in this example. The equations below may also be used to express the relationships between the acceleration data 40A, the angular velocity data 40B, the angular acceleration, and the angular velocity for an IMU B, which may be the IMU 26 of the wearable computing device 10.

$$\tilde{\omega}_A(t) = \omega^A(t) + b_g^A(t) + \eta_g^A(t)$$

$$\tilde{a}_A = R_{AW}(t)(a_W^A(t) - g_W) + b_a^A(t) + \eta_a^A(t)$$

$$\frac{db_a^A}{dt} = \eta_{ba}^A(t)$$

$$\frac{db_g^A}{dt} = \eta_{bg}^A(t)$$

(Equations 1a-1d)

In the first equation, $\tilde{\omega}_A(t)$ is an angular velocity measurement for the IMU A, $\omega^A(t)$ is the true angular velocity for the IMU A, $b_g^A(t)$ is a gyroscope bias for the IMU A, and $\eta_g^A(t)$ is Gaussian white noise in the angular velocity measurement for the IMU A. In the second equation, $\tilde{a}_A$ is an angular velocity measurement for the IMU A, $R_{AW}(\ )$ is a rotational offset of the IMU A relative to a world frame, $a_W^A(t)$ is the acceleration of the IMU A in the world frame, $g_W$ is a constant gravity vector in the world frame, $b_a^A(t)$ is an accelerometer bias for the IMU A, and $\eta_a^A(t)$ is Gaussian white noise for the acceleration measurement for the IMU A. In the third and fourth equations, $\eta_{ba}^A(t)$ is Gaussian white noise in the accelerometer bias for the IMU A, and $\eta_{bg}^A(t)$ is Gaussian white noise in the gyroscope bias for the IMU A.

Figure 3:
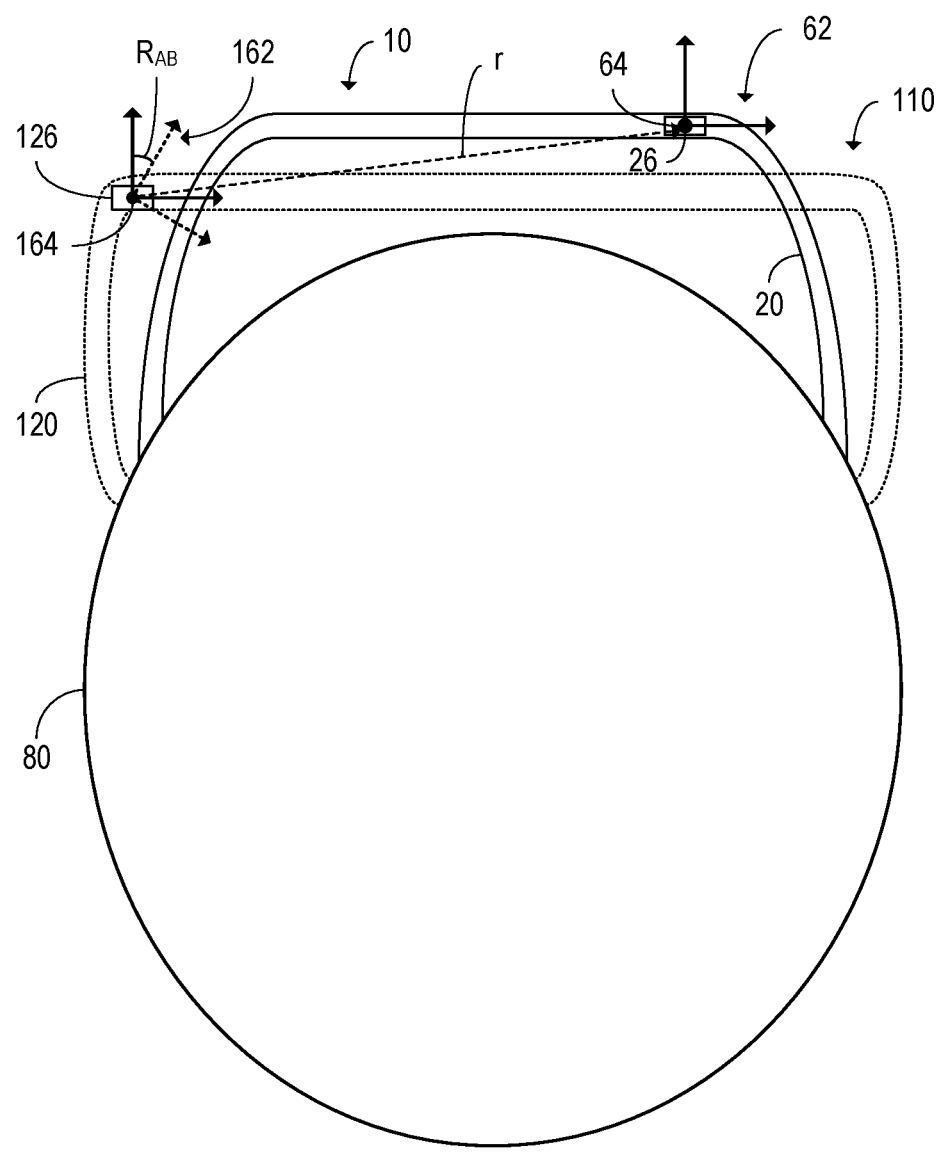
FIG. 3 shows an example runtime coordinate frame and an example training coordinate frame when the user is wearing the wearable computing device, according to the example of FIG. 1A.

When the processor 12 receives the kinematic data 40, the kinematic data 40 may be expressed in a runtime coordinate frame 62, as shown in the example of FIG. 3. FIG. 3 shows an example top view of the head of the user 80 when the user is wearing the wearable computing device 10. The runtime coordinate frame 62, in the example of FIG. 3, is centered at the first IMU mounting location 64 at which the IMU 26 is located within the device body 20. In other examples, the runtime coordinate frame 62 may be centered at some other location, such as between the user's eyes.

FIG. 3 further shows a training wearable computing device 110 including a training IMU 126. The training wearable computing device 110 may be a wearable computing device at which a machine learning model used at the wearable computing device 10 was trained, as discussed in further detail below. As shown in the example of FIG. 3, the training wearable computing device 110 may have a second device body 120 with a second IMU mounting location 164 that differs from the first IMU mounting location 64. Thus, the training wearable computing device 110 may have a training coordinate frame 162. The first IMU mounting location 64 may have a translational pose offset r relative to the second IMU mounting location 164. In addition, the training coordinate frame 162 may have a rotational mounting pose offset $R_{AB}$ from the runtime coordinate frame 62 to the training coordinate frame 162.

Returning to FIG. 2, the processor 12 may be further configured to perform a first coordinate transformation on the kinematic data 40 from the runtime coordinate frame 62 into a training coordinate frame 162 of a training wearable computing device 110. When the processor 12 performs the first coordinate transformation on the kinematic data 40, the processor 12 may obtain transformed kinematic data 50. The transformed kinematic data 50 may include transformed acceleration data 50A, transformed angular velocity data 50B, and/or transformed magnetic field data 50C. The processor 12 may be configured to perform the first coordinate transformation at least in part by computing a plurality of calibration parameters 42 for the wearable computing device 10, computing a plurality of runtime correction parameters 44 for the wearable computing device 10 based on the kinematic data 40, and computing the first coordinate transformation as specified by the plurality of calibration parameters 42 and the plurality of runtime correction parameters 44.

The plurality of calibration parameters 42 may be computed for the wearable computing device 10 prior to runtime, during a calibration phase. In some examples, the plurality of calibration parameters 42 may include the translational mounting pose offset r between the second IMU mounting location 164 and the first IMU mounting location 64 and the rotational mounting pose offset $R_{AB}$ between the runtime coordinate frame 62 and the training coordinate frame 162. The translational mounting pose offset r may be computed as a three-dimensional vector and may indicate translational offsets in the x, y, and z directions. The rotational mounting pose offset $R_{AB}$ may be computed as a 3×3 rotation matrix and may indicate rotational offsets in the pitch, roll, and yaw directions. In some examples, r may additionally or alternatively be computed as a translational offset from the second IMU mounting location to the first IMU mounting location, and a rotational mounting pose offset $R_{BA}$ may be computed from the training coordinate frame 162 to the runtime coordinate frame 62. The rotational mounting pose offset $R_{BA}$ may be generated from the rotational mounting pose offset $R_{AB}$ via matrix inversion. Similarly, the rotational mounting pose offset $R_{AB}$ may be generated by inverting $R_{BA}$.

In the calibration phase for the wearable computing device 10, the plurality of calibration parameters may, for example, be computed at the processor 12 via a single point active alignment method. When the single point active alignment method is performed, the user 80 may align two-dimensional crosshairs displayed on the display 32 with a point in the physical environment that has known spatial coordinates. The processor 12 may be further configured to use SLAM to determine the pose of the wearable computing device 10 relative to a world frame of the physical environment when the crosshairs are aligned with the point. The processor 12 may be further configured to solve a perspective-n-point problem with the location of the crosshairs and the pose of the wearable computing device 10 relative to the world frame as inputs and the pose of the IMU 26 relative to the eyes of the user 80 (or relative to some other point on the user's body) as an output. For example, the processor 12 may be configured to solve the perspective-n-point problem using the P3P algorithm or the Efficient PnP algorithm.

During a training calibration phase, the single point active alignment method may also be performed for the training wearable computing device 110. The single point active alignment method may be used to determine the pose of a training IMU included in the training wearable computing device 110 relative to a training user's eyes or some other point on the training user's body. During the calibration phase for the wearable computing device 10, the processor 12 may be further configured to compute the translational mounting pose offset r and the rotational mounting pose offset $R_{AB}$ by computing a difference between the poses computed as solutions to the perspective-n-point problems in the training calibration phase and the calibration phase.

The plurality of runtime correction parameters 44 may include an angular velocity correction parameter ω, an angular acceleration correction parameter α, and a runtime world-frame orientation $R_{BW}$ of the IMU 26 relative to a world frame. In the example of FIG. 2, the angular velocity correction parameter ω and the angular acceleration correction parameter α are the angular velocity and the angular acceleration of the wearable computing device 10 that are respectively computed from the acceleration data 40A and the angular velocity data 40B. The world frame relative to which the processor 12 may compute the runtime world-frame orientation $R_{BW}$ may be a reference frame centered at a fixed location in the physical environment in which the wearable computing device 10 is located.

In some examples, the processor 12 may be configured to compute the plurality of runtime correction parameters 44 at least in part by applying a Kalman filter 52 to the kinematic data 40. In such examples, the Kalman filter 52 may be iteratively applied to the kinematic data 40 over the plurality of timesteps 46 for which the kinematic data 40 is received. At the Kalman filter 52, the processor 12 may be configured to generate state estimates ω(t), α(t), and $R_{BW}$(t), where t is a current timestep 46. The processor 12 may be further configured to generate predicted values of the state estimates ω(t), α(t), and $R_{BW}$(t) for a subsequent timestep 46. At the subsequent timestep 46, the processor 12 may be further configured to update the predicted values of the state estimates based on the kinematic data 40 received from the IMU 26 at that timestep 46 to determine updated values of the state estimates. Thus, at the Kalman filter 52, the processor 12 may be configured to update the estimated values of the runtime correction parameters 44 as the kinematic data 40 is received over a plurality of timesteps 46.

Figure 4:
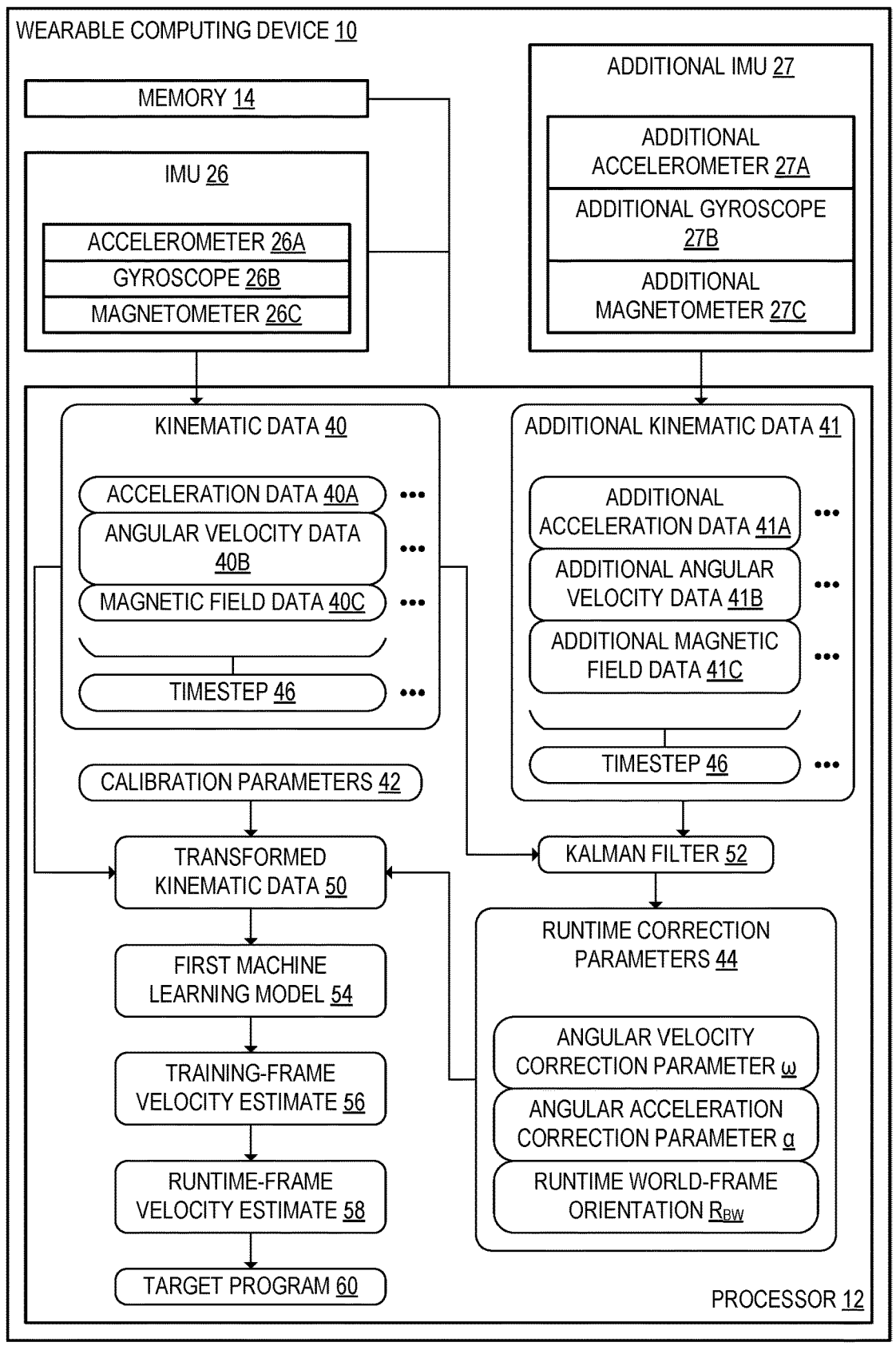
FIG. 4 schematically shows the wearable computing device of FIG. 1A when kinematic data and additional kinematic data are received at the processor from an inertial measurement unit (IMU) and an additional IMU, respectively.

In some examples, as shown in FIG. 4, the wearable computing device 10 may further include an additional IMU 27. The additional IMU 27 may, for example, include an additional accelerometer 27A, and additional gyroscope 27B, and an additional magnetometer 27C. While the device body 20 is mounted on the body of the user 80, the processor 12 may be further configured to receive additional kinematic data 41 from the additional IMU 27. The additional kinematic data 41 may, for example, include additional acceleration data 41A, additional angular velocity data 41B, and additional magnetic field data 41C. The additional kinematic data 41 may be received for the timesteps 46 for which the kinematic data 40 is also received.

In examples in which the processor 12 is configured to receive the additional kinematic data 41, the processor 12 may be further configured to compute the angular acceleration correction parameter α based at least in part on the additional kinematic data 41 as well as the kinematic data 40. For example, computing the angular acceleration parameter α may include applying a Kalman filter or a differentiator to the angular velocity data 40B. Using both the kinematic data 40 received from the IMU 26 and the additional kinematic data 41 received from the additional IMU 27 may allow the processor 12 to compute the angular acceleration correction parameter α with higher accuracy.

Returning to FIG. 2, After the processor 12 has estimated the values of the calibration parameters 42 and the runtime correction parameters 44, the processor 12 may be further configured to perform the first coordinate transformation to generate the transformed kinematic data 50. The relationship between the angular velocity and angular acceleration of the training IMU 126 (IMU A) and the angular velocity and angular acceleration of the IMU 26 (IMU B) may be expressed in the following equations:

$$\omega^A(t) = R_{AB}\omega^B(t)$$

$$a_W^A(t) = a_W^B(t) + R_{WB}(t)[\alpha^B(t) \times r - \omega^B(t) \times (\omega^B(t) \times r)] \quad \text{(Equations 2a-2b)}$$

By substituting equations 2a-2b into equation 1d, an acceleration measurement at the IMU A may be expressed as follows:

$$\tilde{a}_A(t) = R_{AW}(t)(a_W^B(t) + R_{WB}(t)[\alpha^B(t) \times r - \omega^B(t) \times (\omega^B(t) \times r)] - g_W) + b_a^A + \eta_a^A = R_{AB}(R_{BW}(t)(a_W^B(t) - g_W) + R_{BA}^{-1}b_a^A(t) + R_{BA}\eta_a^A(t)) + R_{AB}(\alpha^B(t) \times r - \omega^B(t) \times (\omega^B(t) \times r)) \quad \text{(Equation 3)}$$

In Equation 3, the terms $R_{BW}(t)(a_W^B(t)-g_W)+R_{BA}b_a^A(t)+R_{BA}\eta_a^A(t)$ have the form of an acceleration measurement at the IMU B with a rotation applied to the bias and the Gaussian white noise. However, since the bias and the Gaussian white noise are assumed to be random processes with isotropic probability distributions, the bias and the Gaussian white noise are unaffected by the rotation.

The transformed acceleration data 50A and the transformed angular velocity data 50B may be computed as pseudo-measurements in the training coordinate frame 162 that are computed using the acceleration data 40A, the angular velocity data 40B, the calibration parameters r and $R_{AB}$, and the runtime correction parameters $\omega^B$, $\alpha^B$, and $R_{BW}$. The transformed acceleration data 50A and the transformed angular velocity data 50B may be computed using the following equations:

$$\hat{a}(t)=R_{AB}[\tilde{a}_B(t)+\alpha^B(t)\times r+\omega^B(t)\times(\omega^B(t)\times r)]$$

$$\omega A(t)=R_{AB}\tilde{\omega}^B(t) \qquad \text{(Equations 4a-4b)}$$

The processor 12 may be further configured to compute a training-frame velocity estimate 56 for the wearable computing device 10 based at least in part on the transformed kinematic data 50. The training-frame velocity estimate 56 may be computed at a first machine learning model 54, which may be a recurrent neural network (RNN). For example, the first machine learning model 54 may be a long short-term memory (LSTM), a gated recurrent unit (GRU), a temporal convolutional network (TCN), or some other type of RNN. The training-frame velocity estimate 56 may be a pseudo-measurement generated according to the following equation:

$$\hat{u}_A(t)=DNN(\hat{\omega}_A(t),\hat{a}^A(t)) \qquad \text{(Equation 5)}$$

In the above equation, DNN is the function encoded by the first machine learning model 54.

Figure 5:
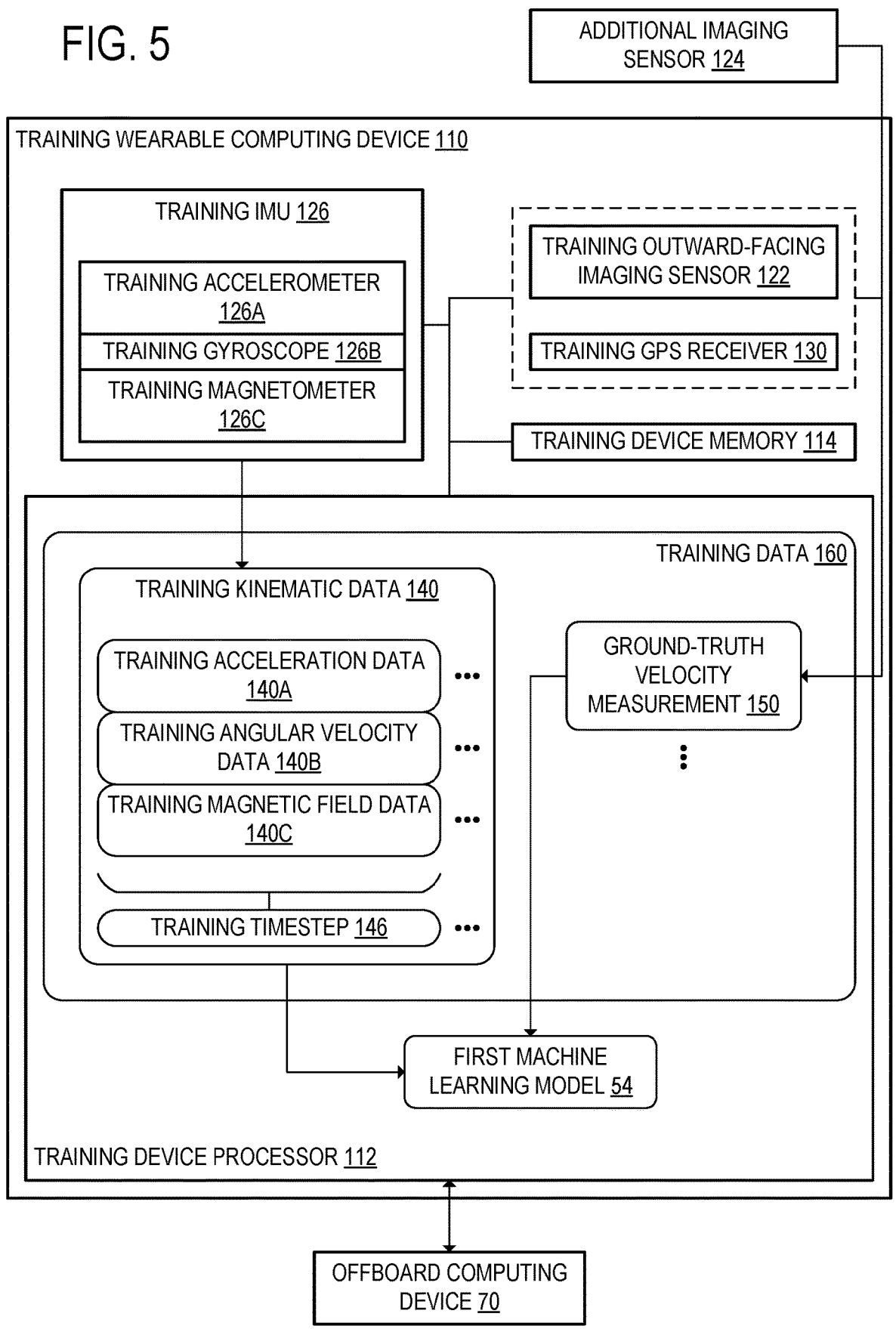
FIG. 5 schematically shows a training wearable computing device during training of a first machine learning model, according to the example of FIG. 1A.

FIG. 5 shows the training wearable computing device 110 when the first machine learning model 54 is trained, according to one example. As shown in the example of FIG. 5, the first machine learning model 54 may be trained at a training device processor 112 of the training wearable computing device 110. Training device memory 114 included in the training wearable computing device 110 may also be utilized when training the first machine learning model 54. In some examples, the first machine learning model 54 may be trained at least in part at an offboard computing device 70 configured to communicate with the training wearable computing device 110. The training device processor 112 may be configured to offload one or more computational tasks to the offboard computing device 70.

The first machine learning model 54 may be trained using training data 160 including training kinematic data 140 collected at a training IMU 126 of the training wearable computing device 110. The training kinematic data 140 may, for example, include training acceleration data 140A received from a training accelerometer 126A of the training IMU 126 and training angular velocity data 140B received from a training gyroscope 126B of the training IMU 126. In some examples, the training kinematic data 140 may further include training magnetic field data 140C received from a training magnetometer 126C of the training IMU 126. The training kinematic data 140 may be received at a training device processor 112 of the training wearable computing device 110 in a plurality of training timesteps 146.

In addition to the training kinematic data 140, the training data 160 may further include a plurality of ground-truth velocity measurements 150 collected for the training wearable computing device 110. For example, the plurality of ground-truth velocity measurements 150 may be determined via SLAM based on imaging data received from one or more training outward-facing imaging sensors 122 included in the training wearable computing device 110. Additionally or alternatively, the plurality of ground-truth velocity measurements 150 may be received at least in part from a training GPS receiver 130 included in the training wearable computing device 110. In some examples, the plurality of ground-truth velocity measurements 150 may additionally or alternatively be received from one or more additional imaging sensors 124 that are located outside the wearable computing device 110 and configured to image the training wearable computing device 110 as the training wearable computing device 110 moves through the physical environment.

Figure 6:
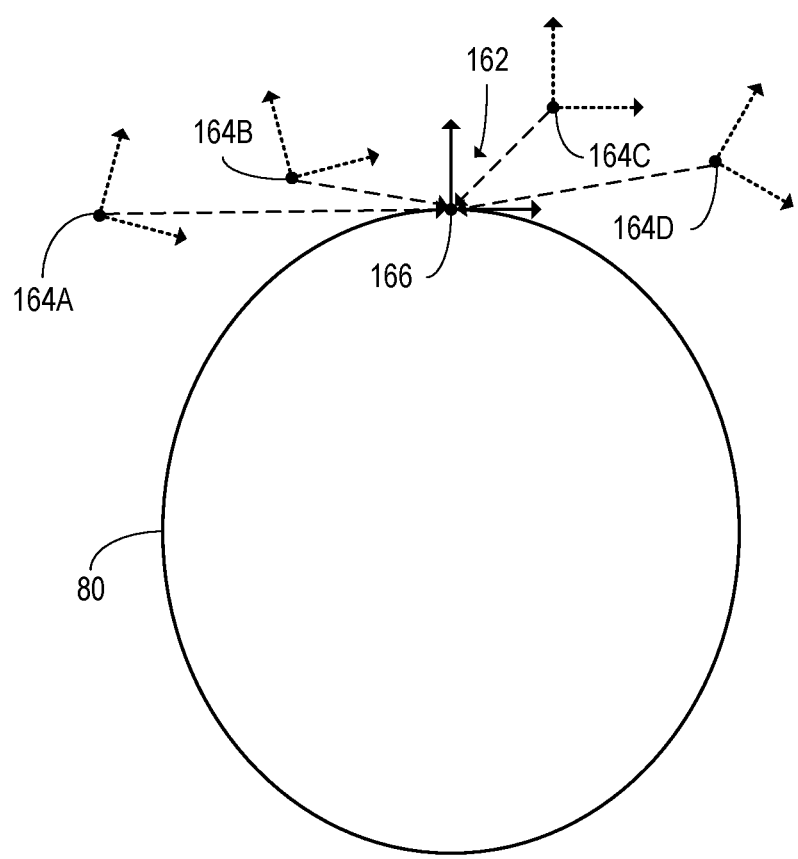
FIG. 6 shows a plurality of differing IMU mounting locations of a plurality of training wearable computing devices, according to the example of FIG. 1A.

In some examples, the training kinematic data 140 may be collected at a plurality of training wearable computing devices 110 including the training wearable computing device 110. In such examples, the plurality of training wearable computing devices 110 may each have the second IMU mounting location 164. Alternatively, the plurality of training wearable computing devices 110 may have a plurality of differing IMU mounting locations. FIG. 6 shows a first differing IMU mounting location 164A, a second differing IMU mounting location 164B, a third differing IMU mounting location 164C, and a fourth differing mounting location 164D, according to one example. The plurality of training IMUs 126 in the example of FIG. 6 also have different rotational offsets relative to the world frame. In examples in which the plurality of training wearable computing devices 110 have a plurality of differing IMU mounting locations, the training coordinate frame 162 may be a canonical location 166 for the plurality of training wearable computing devices 110. The canonical location 166 may, for example, be a location between the eyes of the user 80 or at a specific IMU mounting location among the plurality of differing IMU mounting locations. In the example of FIG. 6, the canonical location 166 is located between the eyes of the user 80.

In examples in which the plurality of training wearable computing devices 110 have a plurality of differing IMU mounting locations, training the first machine learning model 54 may further include transforming the training kinematic data 140 collected at each of the plurality of training wearable computing devices 110 into the training coordinate frame 162. The training kinematic data 140 collected at each of the plurality of training wearable computing devices 110 may be transformed into the training coordinate frame 162 as though it were runtime kinematic data using the techniques discussed above.

Returning to FIG. 2, after the processor 12 has generated the training-frame velocity estimate 56, the processor 12 may be further configured to perform a second coordinate transformation on the training-frame velocity estimate 56 from the training coordinate frame 162 into the runtime coordinate frame 62. Thus, the processor 12 may be further configured to obtain a runtime-frame velocity estimate 58 for the wearable computing device 10. The processor 12 may be configured to perform the second coordinate transformation according to the following equation:

$$\hat{u}_B(t)=\hat{u}_A(t)+R_{BA}\hat{\omega}^A(t)\times r \qquad \text{(Equation 6)}$$

Thus, the processor 12 may be configured to generate an accurate estimate of the velocity of the wearable computing device 10 from the kinematic data 40 without having to train a machine learning model that is specific to the hardware configuration of the wearable computing device 10.

The processor 12 may be further configured to output the runtime-frame velocity estimate 58 to a target program 60. For example, the target program 60 may be a navigation application program configured to determine a spatial position of the wearable computing device 10. As another example, the runtime-frame velocity estimate 58 may be output to a target program 60 that is configured to display virtual images to the user 80 in a mixed-reality environment. In some examples, at the target program 60, the processor 12 may be further configured to estimate a pose of the wearable computing device 10 based on the runtime-frame velocity estimate 58.

In some examples, the processor 12 computes the plurality of runtime correction parameters 44, the processor 12 may be further configured to perform fixed-point iteration using the first machine learning model 54 to update the Kalman filter 52. In such examples, the processor 12 may be configured to generate a plurality of iterations of the training-frame velocity estimate 56 prior to outputting a last iteration of the training-frame velocity estimate 56 to the target program 60. The processor 12 may be configured to repeat the following steps until the training-frame velocity estimate 56 converges to a fixed value, within a predefined convergence threshold:

$$\hat{u}_B^k(t) = DNN(\hat{a}_A^k(t), \hat{\omega}_A^k(t); M_a) + \omega(t) \times r$$

$$a_B^k(t), \omega_B^k(t), R_{BW}^k(t) = g(\tilde{a}_B(t), \tilde{\omega}_B(t), \hat{u}_B^k(t))$$

$$\hat{a}_A(t) = R_{AB}[\tilde{a}_B(t) + (a_B^k(t) \times r - \omega_B^k(t) \times (w_B^k(t) \times r))]$$

$$\hat{\omega}_A(t) = R_{AB}\tilde{\omega}^B(t)$$

$$k = k+1 \quad \text{(Algorithm1)}$$

In the fixed-point iteration algorithm shown above, the superscript k denotes the value of a variable at the kth iteration, $M_a$ denotes the parameters of the first machine learning model 54, and g denotes the Kalman filter 52. Using fixed-point iteration to update the Kalman filter 52 may result in more accurate estimates of the runtime correction parameters 44.

Figure 7:
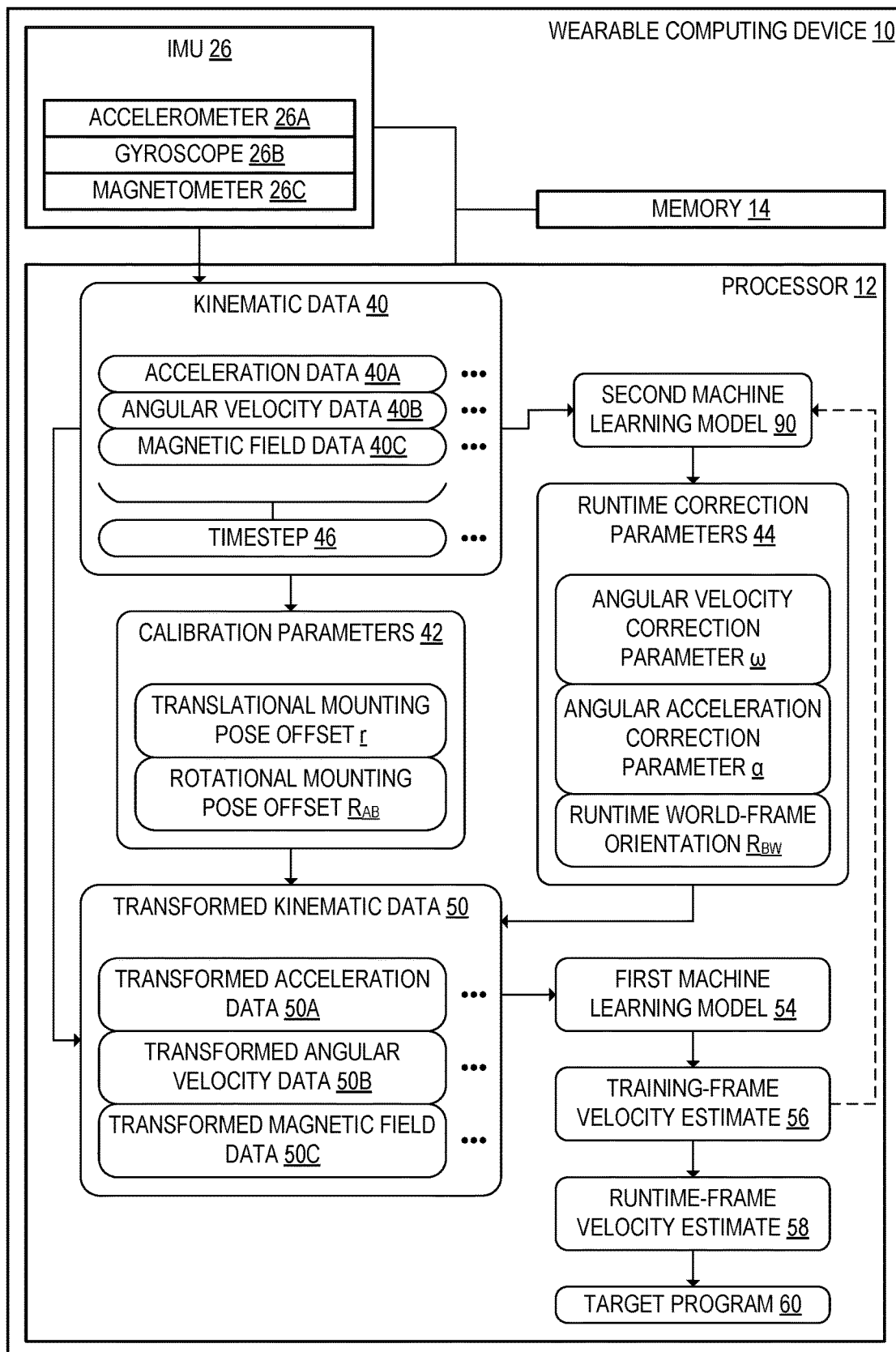
FIG. 7 schematically shows the wearable computing device of FIG. 1A when the processor is configured to execute a second machine learning model.

In some examples, as shown in FIG. 7, the processor 12 may be configured to compute the plurality of runtime correction parameters 44 at least in part at a second machine learning model 90. The second machine learning model 90 may be a machine learning model that is specific to the wearable computing device 10 but has a lower computational cost of training relative to the first machine learning model 54. For example, the second machine learning model 90 may have fewer parameters than the first machine learning model 54. In addition, the second machine learning model 90 may be trained using less training data than the first machine learning model 54. The second machine learning model 90 may be an RNN, such as an LSTM, a GRU, a TCN, or some other type of RNN. In examples in which the processor 12 is configured to implement the second machine learning model 90, fixed-point iteration may be performed to determine the runtime correction parameters 44 using the second machine learning model 90 in place of the Kalman filter 52.

Figure 8:
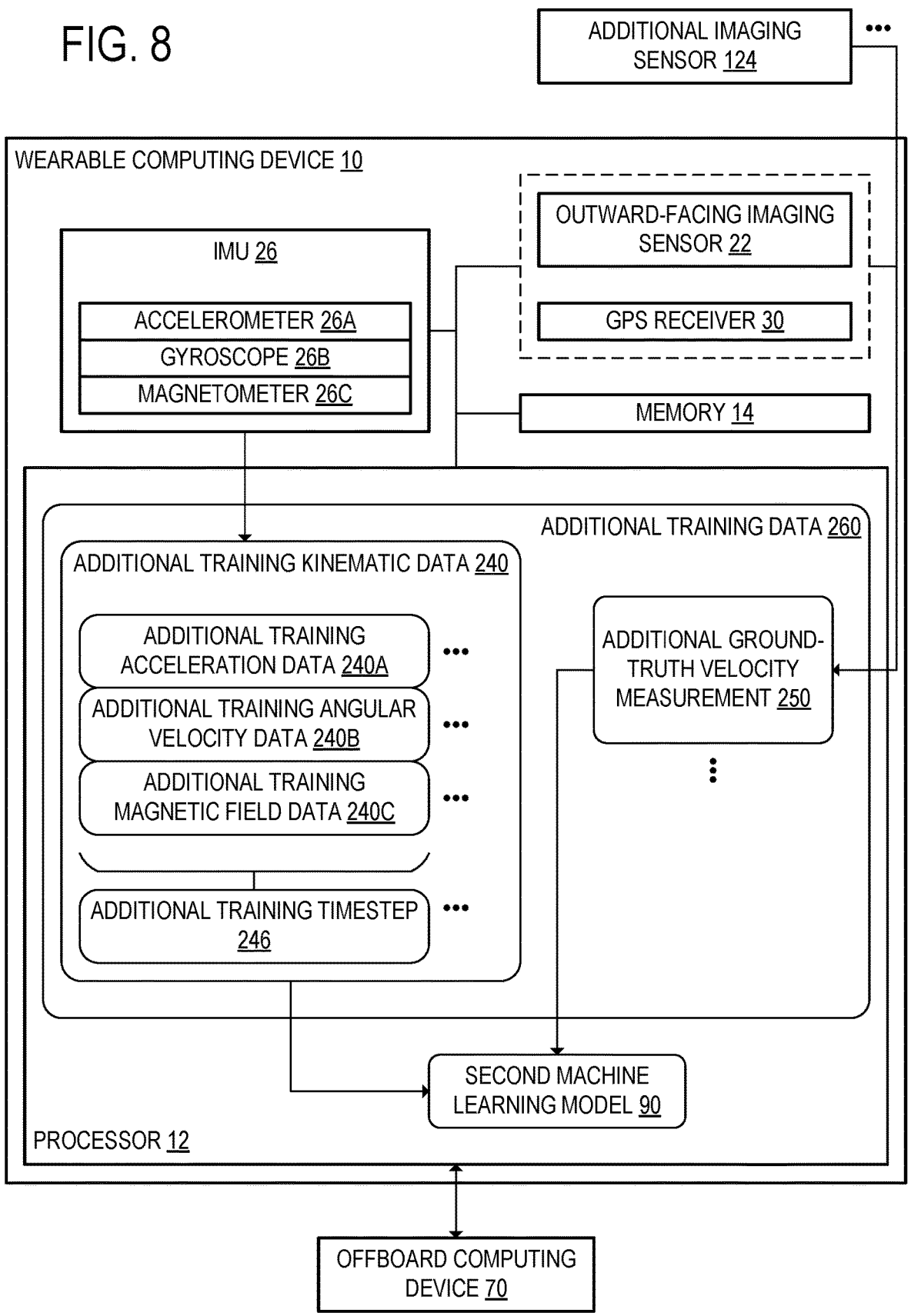
FIG. 8 schematically shows the wearable computing device of FIG. 1A during training of the second machine learning model.

FIG. 8 schematically shows the wearable computing device 10 during training of the second machine learning model 90. The second machine learning model 90 may be trained using additional training data 260, which may include additional training kinematic data 240 and a plurality of additional ground-truth velocity measurements 250. The additional training kinematic data 240 may include additional training acceleration data 240A received from an accelerometer 26A included in the IMU 26 and additional angular velocity data 240B received from a gyroscope 26B included in the IMU 26. In some examples, the additional training kinematic data 240 may further include additional training magnetic field data 240C received from a magnetometer 26C included in the IMU 26. The additional training kinematic data 240 may be received in each of a plurality of additional training timesteps 246.

The additional ground-truth velocity measurements 250 may be received at least in part from the outward-facing imaging sensor 22 of the wearable computing device 10. When the additional ground-truth velocity measurements 250 are received at least in part from the outward-facing imaging sensor 22, the processor 12 may be further configured to perform preliminary processing on the optical data received from the outward facing imaging sensor 22 prior to using the optical data as training data for the second machine learning model 90. For example, the processor 12 may be configured to perform SLAM on the optical data to convert the optical data into the plurality of additional ground-truth velocity measurements 250. In some examples, the plurality of additional ground-truth velocity measurements 250 may additionally or alternatively be received at least in part from the GPS receiver 30. Additionally or alternatively, the plurality of additional ground-truth velocity measurements 250 may be received at least in part from one or more additional imaging sensors 124 that are located externally to the wearable computing device 10 and are configured to image the wearable computing device 10. The plurality of additional ground-truth velocity measurements 250 may correspond to the plurality of additional training timesteps 246 for which the additional training kinematic data 240 is received.

The second machine learning model 90 may, in some examples, be trained at least in part at an offboard computing device 70 configured to communicate with the processor 12 of the wearable computing device 10. The processor 12 may be configured to offload one or more computational tasks performed when training the second machine learning model 90 to the offboard computing device 70.

Figure 9A:
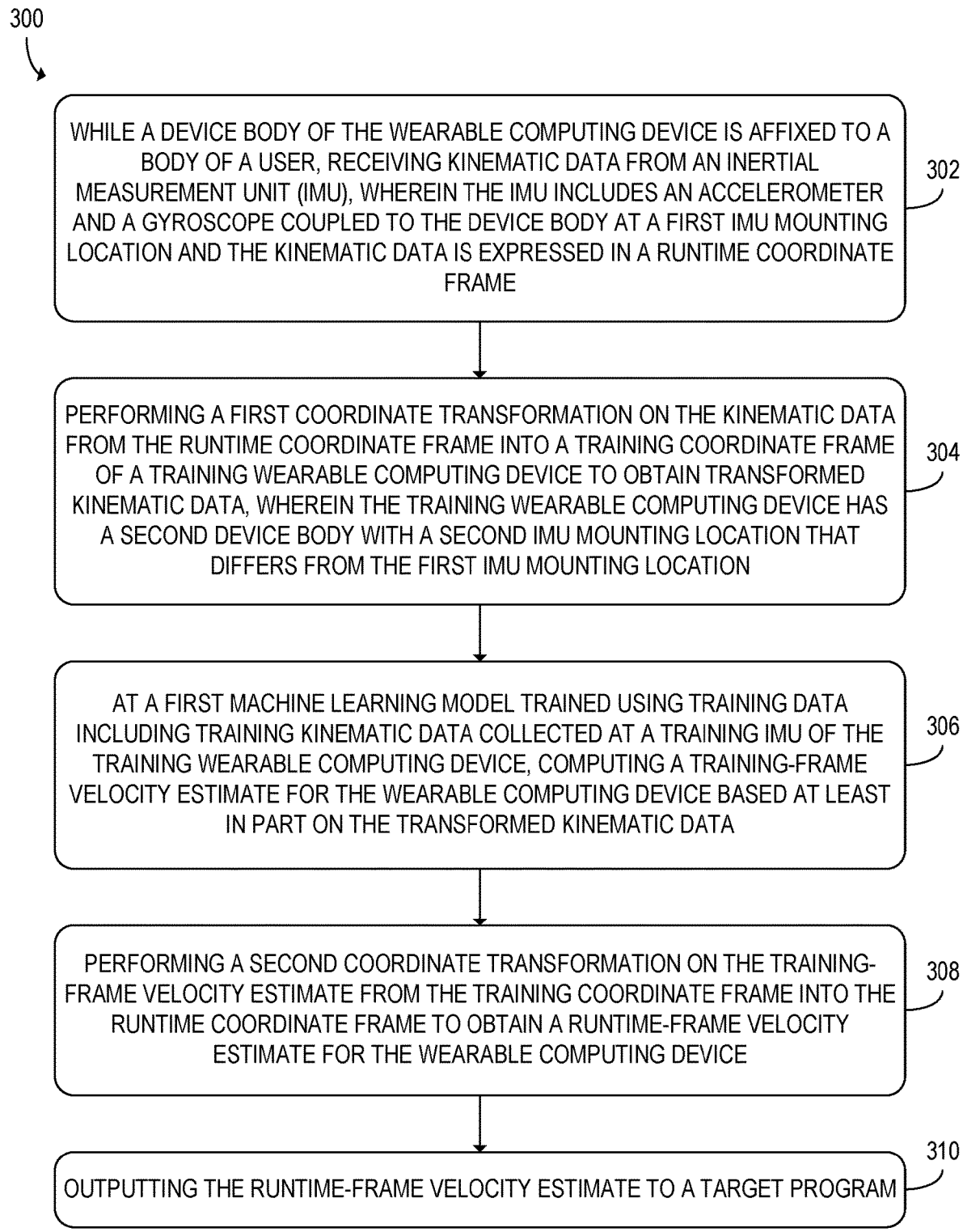
FIG. 9A shows a flowchart of an example method for use with a wearable computing device, according to the example of FIG. 1A.

FIG. 9 shows a flowchart of a method 300 for use with a wearable computing device. The method 300 may, for example, be used with the wearable computing device 10 of FIG. 1A. The steps of the method 300 may be performed at a processor of the wearable computing device. At step 302, the method 300 may include, while a device body of the wearable computing device is affixed to a body of a user, receiving kinematic data from an IMU included in the wearable computing device. The IMU may include an accelerometer and a gyroscope coupled to the device body at a first IMU mounting location. The kinematic data received from the IMU may include acceleration data for the wearable computing device received from the accelerometer and angular velocity data for the wearable computing device received from the gyroscope. In some examples, the IMU may further include a magnetometer. The kinematic data may, in such examples, further include magnetic field data received from the magnetometer. The kinematic data may be expressed in a runtime coordinate frame. The runtime coordinate frame may, for example, be a 6DOF coordinate frame that includes x, y, z, pitch, roll, and yaw directions. In some examples, the runtime coordinate frame may be centered at the first IMU mounting location.

At step 304, the method 300 may further include performing a first coordinate transformation on the kinematic data from the runtime coordinate frame into a training coordinate frame of a training wearable computing device. Thus, the method 300 may include obtaining transformed kinematic data. The training wearable computing device may be a wearable computing device at which a first machine learning model was trained and may have a second device body with a second IMU mounting location that differs from the first IMU mounting location. The training coordinate frame may be a 6DOF coordinate frame that includes x, y, z, pitch, roll, and yaw directions, and may, for example, be centered at the second IMU mounting location.

At step 306, the method 300 may further include computing a training-frame velocity estimate for the wearable computing device based at least in part on the transformed kinematic data. The training-frame velocity estimate may be computed at a first machine learning model trained using training data including training kinematic data collected at a training IMU of the training wearable computing device. The training data may further include a plurality of ground-truth velocity measurements collected for the training wearable computing device. For example, the plurality of ground-truth velocity measurements may be collected via imaging-based SLAM and/or GPS. The first machine learning model may be an RNN, such as an LSTM, a GRU, a TCN, or some other type of RNN.

When the first machine learning model is trained, in some examples, the training kinematic data may be collected at a plurality of training wearable computing devices including the training wearable computing device. In such examples, the plurality of training wearable computing devices may each include respective training IMUs mounted at the second IMU mounting location. Alternatively, the plurality of training wearable computing devices may have a plurality of differing IMU mounting locations. When the plurality of training IMUs have a plurality of differing IMU mounting locations, training the first machine learning model may further include transforming the training kinematic data collected at each of the plurality of training wearable computing devices into the training coordinate frame. The training coordinate frame may, in such examples, be centered at a canonical location such as a point between the eyes of the user. The training kinematic data collected at the plurality of training wearable computing device may be transformed into the training coordinate frame using the techniques by which the kinematic data collected at runtime is transformed into the training coordinate frame.

At step 308, the method 300 may further include performing a second coordinate transformation on the training-frame velocity estimate from the training coordinate frame into the runtime coordinate frame to obtain a runtime-frame velocity estimate for the wearable computing device. Thus, the runtime-frame velocity estimate may be expressed in the same coordinate frame as the kinematic data. At step 310, the method 300 may further include outputting the runtime-frame velocity estimate to a target program.

Figure 9B:
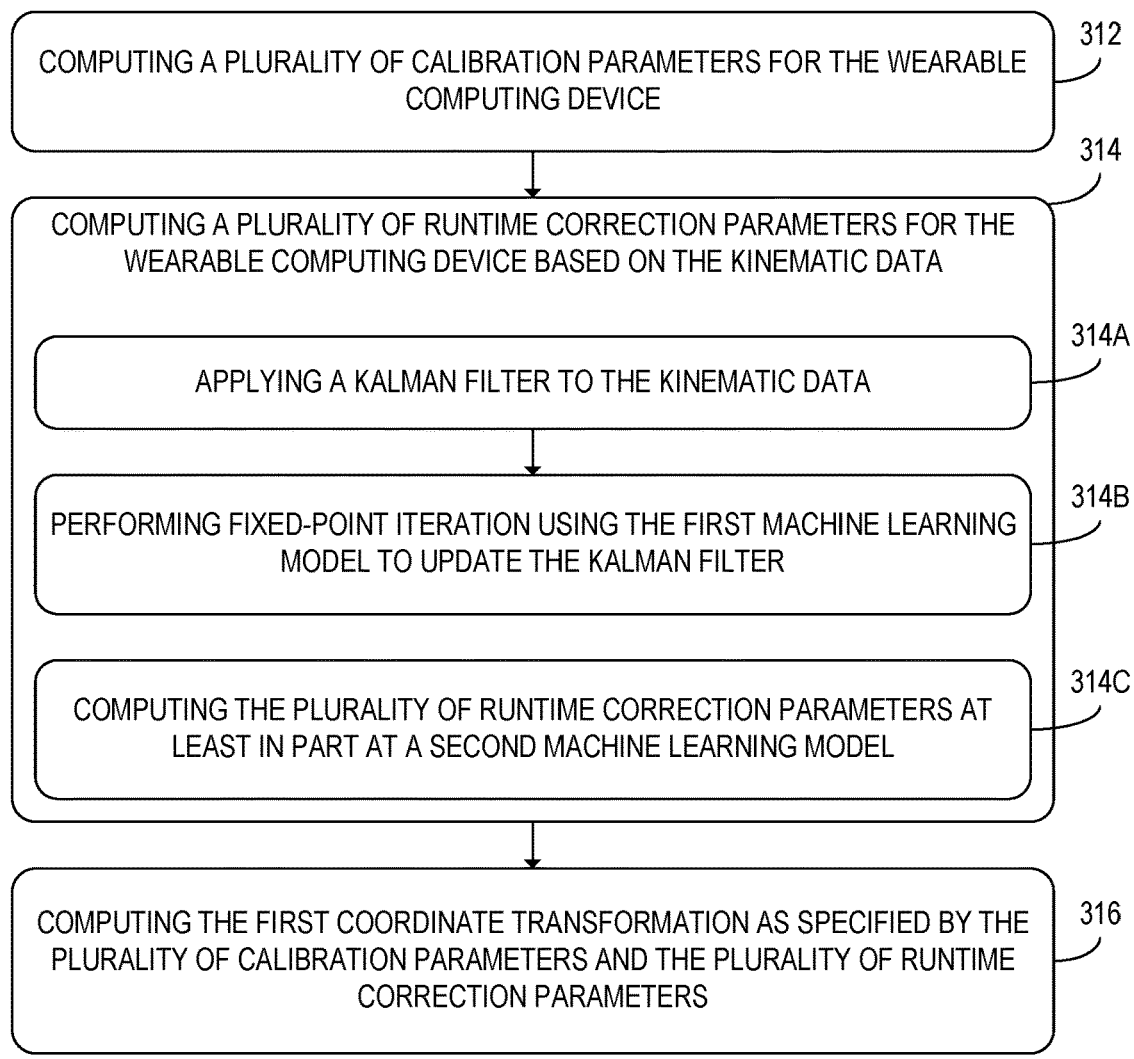
FIGS. 9B-9C show additional steps of the method of FIG. 9A that may be performed in some examples.

FIG. 9B shows additional steps of the method 300 that may be performed in some examples when the first coordinate transformation is performed at step 304. At step 312, the method 300 may further include computing a plurality of calibration parameters for the wearable computing device. The plurality of calibration parameters may include a translational mounting pose offset between the second IMU mounting location and the first IMU mounting location. In addition, the plurality of calibration parameters may further include a rotational mounting pose offset between the runtime coordinate frame and the training coordinate frame. The calibration parameters may be determined during a calibration phase for the wearable computing device that is performed prior to runtime.

At step 314, the method 300 may further include computing a plurality of runtime correction parameters for the wearable computing device based on the kinematic data. The plurality of runtime correction parameters may, for example, include an angular velocity correction parameter, an angular acceleration correction parameter, and a runtime world-frame orientation of the IMU relative to a world frame. In such examples, the world frame relative to which the orientation of the IMU is determined may be centered at a fixed location in the physical environment in which the wearable computing device is located.

In some examples, step 314 may further include, at step 314A, applying a Kalman filter to the kinematic data. At the Kalman filter, predicted values of the angular velocity correction parameter, the angular acceleration correction parameter, and the runtime world-frame orientation of the IMU may be generated for a subsequent timestep. In addition, the predicted values may be updated based on the kinematic data when kinematic data for the subsequent timestep is received. In examples in which step 314A is performed, step 314 may further include, at step 314B, performing fixed-point iteration using the first machine learning model to update the Kalman filter. Thus, in examples in which step 314B is performed, the runtime correction parameters may be iteratively updated until the runtime correction parameters converge to stable values.

As an alternative to computing the plurality of runtime correction parameters using a Kalman filter, step 314 may, in some examples, include computing the plurality of runtime correction parameters at least in part at a second machine learning model. The second machine learning model may be configured to receive the kinematic data as input. The second machine learning model may be specific to the wearable computing device and may be trained using additional training kinematic data collected at the wearable computing device. The training data for the second machine learning model may further include additional ground-truth velocity data collected for the wearable computing device, which may be collected at a GPS receiver and/or via imaging-based SLAM.

At step 316, the method 300 may further include computing the first coordinate transformation as specified by the plurality of calibration parameters and the plurality of runtime correction parameters.

Figure 9C:
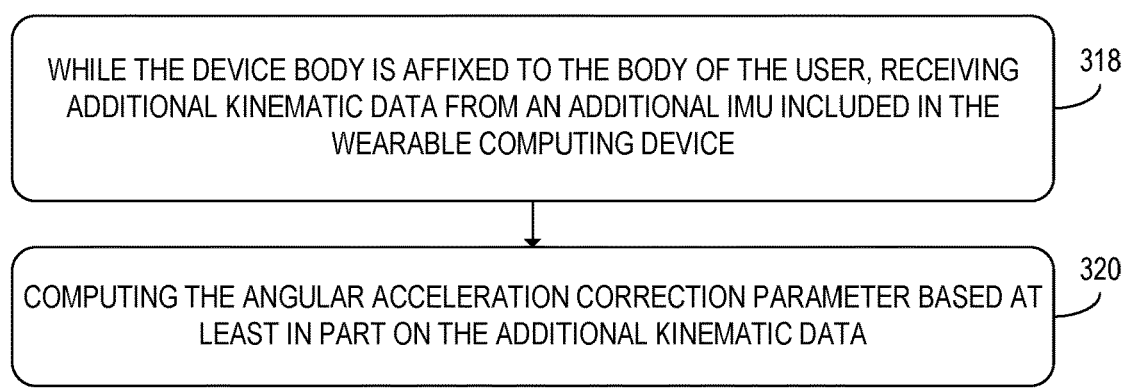

FIG. 9C shows additional steps of the method 300 that may be performed in examples in which a plurality of runtime correction parameters including an angular acceleration correction parameter are computed. At step 318, the method 300 may further include, while the device body is affixed to the body of the user, receiving additional kinematic data from an additional IMU included in the wearable computing device. At step 320, the method 300 may further include computing the angular acceleration correction parameter based at least in part on the additional kinematic data.

Using the devices and methods discussed above, a first machine learning model trained at one wearable computing device may be used to perform inertial odometry at another wearable computing device that has a different hardware configuration. Thus, costs associated with training a separate machine learning model for each hardware configuration may be avoided. The devices and methods discussed above may allow wearable computing devices to be more easily customized in ways that change the location of an IMU while maintaining accurate inertial odometry capabilities.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
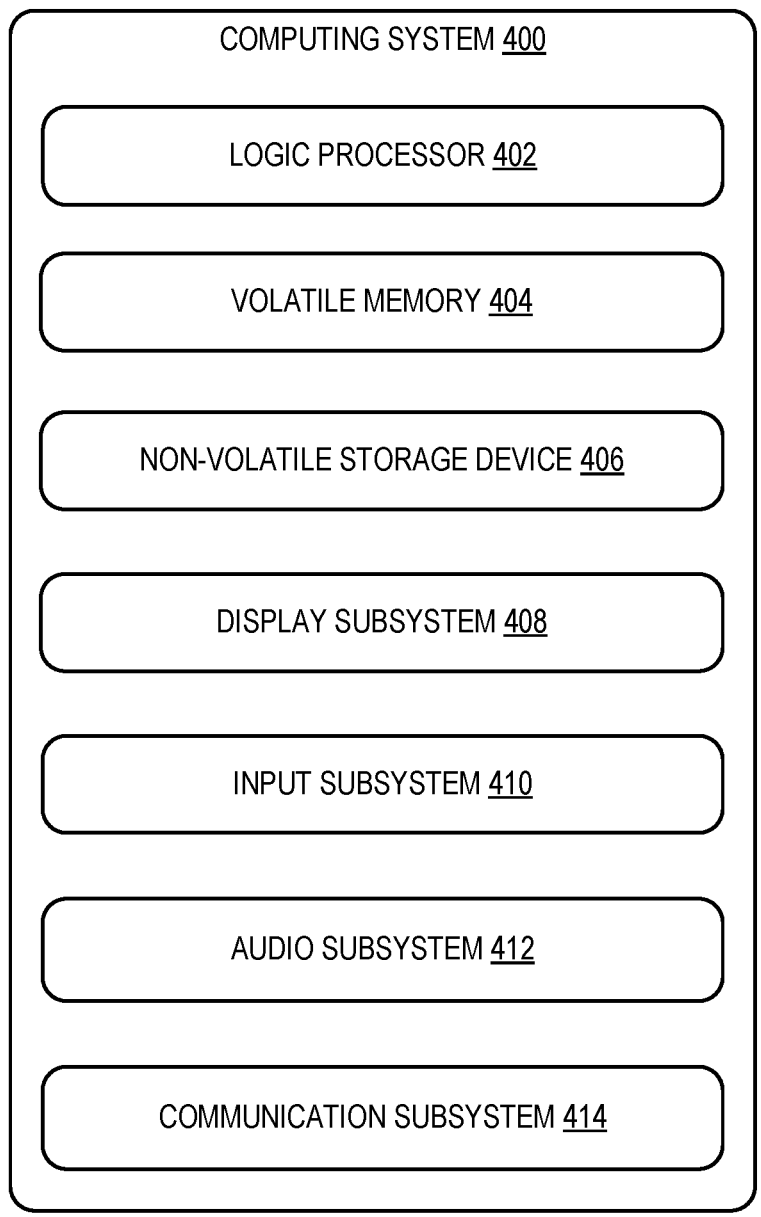
FIG. 10 shows a schematic view of an example computing environment in which the wearable computing device of FIG. 1A may be included.

FIG. 10 schematically shows a non-limiting embodiment of a computing system 400 that can enact one or more of the methods and processes described above. Computing system 400 is shown in simplified form. Computing system 400 may embody the wearable computing device 10 described above and illustrated in FIG. 1A. Components of the computing system 400 be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 414, and/or other components not shown in FIG. 4.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, audio subsystem 412 may include one or more speakers configured to emit audio output. Audio subsystem 412 may additionally or alternatively include one or more microphones configured to receive audio input. In some examples, the one or more microphones may be included in the NUI componentry of the input subsystem 410.

When included, communication subsystem 414 may be configured to communicatively couple various computing devices described herein with each other, and with other devices. Communication subsystem 414 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a wearable computing device is provided, including a device body configured to be affixed to a body of a user. The wearable computing device may further include an inertial measurement unit (IMU) including an accelerometer and a gyroscope coupled to the device body at a first IMU mounting location. The wearable computing device may further include a processor electronically coupled to the IMU. The processor may be configured to, while the device body is affixed to the body of the user, receive kinematic data from the IMU. The kinematic data may be in a runtime coordinate frame. The processor may be further configured to perform a first coordinate transformation on the kinematic data from the runtime coordinate frame into a training coordinate frame of a training wearable computing device to obtain transformed kinematic data. The training wearable computing device may have a second device body with a second IMU mounting location that differs from the first IMU mounting location. At a first machine learning model trained using training data including training kinematic data collected at a training IMU of the training wearable computing device, the processor may be further configured to compute a training-frame velocity estimate for the wearable computing device based at least in part on the transformed kinematic data. The processor may be further configured to perform a second coordinate transformation on the training-frame velocity estimate from the training coordinate frame into the runtime coordinate frame to obtain a runtime-frame velocity estimate for the wearable computing device. The processor may be further configured to output the runtime-frame velocity estimate to a target program.

According to this aspect, the processor may be configured to perform the first coordinate transformation at least in part by computing a plurality of calibration parameters for the wearable computing device. The processor may be further configured to perform the first coordinate transformation at least in part by computing a plurality of runtime correction parameters for the wearable computing device based on the kinematic data and computing the first coordinate transformation as specified by the plurality of calibration parameters and the plurality of runtime correction parameters.

According to this aspect, the plurality of calibration parameters may include a translational mounting pose offset between the second IMU mounting location and the first IMU mounting location and a rotational mounting pose offset between the runtime coordinate frame and the training coordinate frame.

According to this aspect, the plurality of runtime correction parameters may include an angular velocity correction parameter, an angular acceleration correction parameter, and a runtime world-frame orientation of the IMU relative to a world frame.

According to this aspect, the processor may be configured to compute the plurality of runtime correction parameters at least in part by applying a Kalman filter to the kinematic data.

According to this aspect, the processor may be further configured to perform fixed-point iteration using the first machine learning model to update the Kalman filter when the plurality of runtime correction parameters are computed.

According to this aspect, the processor may be configured to compute the plurality of runtime correction parameters at least in part at a second machine learning model.

According to this aspect, the wearable computing device may further include an additional IMU. The processor may be further configured to, while the device body is affixed to the body of the user, receive additional kinematic data from the additional IMU. The processor may be further configured to compute the angular acceleration correction parameter based at least in part on the additional kinematic data.

According to this aspect, the training data may further include a plurality of ground-truth velocity measurements collected for the training wearable computing device.

According to this aspect, the training kinematic data may be collected at a plurality of training wearable computing devices including the training wearable computing device. The plurality of training wearable computing devices may each have the second IMU mounting location.

According to this aspect, the training kinematic data may be collected at a plurality of training wearable computing devices including the training wearable computing device. The plurality of training wearable computing devices may have a plurality of differing IMU mounting locations. Training the first machine learning model may further include transforming the training kinematic data collected at each of the plurality of training wearable computing devices into the training coordinate frame.

According to another aspect of the present disclosure, a method for use with a wearable computing device is provided. The method may include, while a device body of the wearable computing device is affixed to a body of a user, receiving kinematic data from an inertial measurement unit (IMU). The IMU may include an accelerometer and a gyroscope coupled to the device body at a first IMU mounting location. The kinematic data may be expressed in a runtime coordinate frame. The method may further include performing a first coordinate transformation on the kinematic data from the runtime coordinate frame into a training coordinate frame of a training wearable computing device to obtain transformed kinematic data. The training wearable computing device may have a second device body with a second IMU mounting location that differs from the first IMU mounting location. The method may further include, at a first machine learning model trained using training data including training kinematic data collected at a training IMU of the training wearable computing device, computing a training-frame velocity estimate for the wearable computing device based at least in part on the transformed kinematic data. The method may further include performing a second coordinate transformation on the training-frame velocity estimate from the training coordinate frame into the runtime coordinate frame to obtain a runtime-frame velocity estimate for the wearable computing device. The method may further include outputting the runtime-frame velocity estimate to a target program.

According to this aspect, performing the first coordinate transformation may include computing a plurality of calibration parameters for the wearable computing device. Performing the coordinate transformation may further include computing a plurality of runtime correction parameters for the wearable computing device based on the kinematic data and computing the first coordinate transformation as specified by the plurality of calibration parameters and the plurality of runtime correction parameters.

According to this aspect, the plurality of calibration parameters may include a translational mounting pose offset between the second IMU mounting location and the first IMU mounting location and a rotational mounting pose offset between the runtime coordinate frame and the training coordinate frame.

According to this aspect, the plurality of runtime correction parameters may include an angular velocity correction parameter, an angular acceleration correction parameter, and a runtime world-frame orientation of the IMU relative to a world frame.

According to this aspect, computing the plurality of runtime correction parameters may include applying a Kalman filter to the kinematic data.

According to this aspect, the training data may further include a plurality of ground-truth velocity measurements collected for the training wearable computing device.

According to this aspect, the method may further include, while the device body is affixed to the body of the user, receiving additional kinematic data from an additional IMU included in the wearable computing device. The method may further include computing the angular acceleration correction parameter based at least in part on the additional kinematic data.

According to this aspect, the training kinematic data may be collected at a plurality of training wearable computing devices including the training wearable computing device. The plurality of training wearable computing devices may have a plurality of differing IMU mounting locations. Training the first machine learning model may further include transforming the training kinematic data collected at each of the plurality of training wearable computing devices into the training coordinate frame.

According to another aspect of the present disclosure, a wearable computing device is provided, including a device body configured to be affixed to a body of a user. The wearable computing device may further include an inertial measurement unit (IMU) including an accelerometer and a gyroscope coupled to the device body at a first IMU mounting location. The wearable computing device may further include a processor electronically coupled to the IMU. The processor may be configured to, while the device body is affixed to the body of the user, receive kinematic data from the IMU. The kinematic data may be in a runtime coordinate frame. The processor may be further configured to compute a plurality of calibration parameters for the wearable computing device. The plurality of calibration parameters may include a translational mounting pose offset between the second IMU mounting location and the first IMU mounting location and a rotational mounting pose offset between the runtime coordinate frame and the training coordinate frame. The processor may be further configured to compute a plurality of runtime correction parameters for the wearable computing device based on the kinematic data. The plurality of runtime correction parameters may include an angular velocity correction parameter, an angular acceleration correction parameter, and a runtime world-frame orientation of the IMU relative to a world frame. The processor may be further configured to perform a first coordinate transformation, as specified by the plurality of calibration parameters and the plurality of runtime correction parameters, on the kinematic data from the runtime coordinate frame into a training coordinate frame of a training wearable computing device to obtain transformed kinematic data. The training wearable computing device may have a second device body with a second IMU mounting location that differs from the first IMU mounting location. At a first machine learning model trained using training data including training kinematic data collected at a training IMU of the training wearable computing device, the processor may be further configured to compute a training-frame velocity estimate for the wearable computing device based at least in part on the transformed kinematic data. The processor may be further configured to perform a second coordinate transformation on the training-frame velocity estimate from the training coordinate frame into the runtime coordinate frame to obtain a runtime-frame velocity estimate for the wearable computing device. The processor may be further configured to output the runtime-frame velocity estimate to a target program.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable computing device comprising:
   a device body configured to be affixed to a body of a user;
   an inertial measurement unit (IMU) including an accelerometer and a gyroscope coupled to the device body at a first IMU mounting location; and
   a processor electronically coupled to the IMU, wherein the processor is configured to:
   while the device body is affixed to the body of the user, receive kinematic data from the IMU, the kinematic data being in a runtime coordinate frame;
   perform a first coordinate transformation on the kinematic data from the runtime coordinate frame into a training coordinate frame of a training wearable computing device to obtain transformed kinematic data, wherein the training wearable computing device has a second device body with a second IMU mounting location that differs from the first IMU mounting location;

at a first machine learning model trained using training data including training kinematic data collected at a training IMU of the training wearable computing device, compute a training-frame velocity estimate for the wearable computing device based at least in part on the transformed kinematic data;

perform a second coordinate transformation on the training-frame velocity estimate from the training coordinate frame into the runtime coordinate frame to obtain a runtime-frame velocity estimate for the wearable computing device; and output the runtime-frame velocity estimate to a target program.

2. The wearable computing device of claim 1, wherein the processor is configured to perform the first coordinate transformation at least in part by:

computing a plurality of calibration parameters for the wearable computing device;

computing a plurality of runtime correction parameters for the wearable computing device based on the kinematic data; and computing the first coordinate transformation as specified by the plurality of calibration parameters and the plurality of runtime correction parameters.

3. The wearable computing device of claim 2, wherein the plurality of calibration parameters include a translational mounting pose offset between the second IMU mounting location and the first IMU mounting location and a rotational mounting pose offset between the runtime coordinate frame and the training coordinate frame.

4. The wearable computing device of claim 2, wherein the plurality of runtime correction parameters include an angular velocity correction parameter, an angular acceleration correction parameter, and a runtime world-frame orientation of the IMU relative to a world frame.

5. The wearable computing device of claim 4, wherein the processor is configured to compute the plurality of runtime correction parameters at least in part by applying a Kalman filter to the kinematic data.

6. The wearable computing device of claim 5, wherein the processor is further configured to perform fixed-point iteration using the first machine learning model to update the Kalman filter when the plurality of runtime correction parameters are computed.

7. The wearable computing device of claim 4, wherein the processor is configured to compute the plurality of runtime correction parameters at least in part at a second machine learning model.

8. The wearable computing device of claim 4, further comprising an additional IMU, wherein the processor is further configured to:

while the device body is affixed to the body of the user, receive additional kinematic data from the additional IMU; and compute the angular acceleration correction parameter based at least in part on the additional kinematic data.

9. The wearable computing device of claim 1, wherein the training data further includes a plurality of ground-truth velocity measurements collected for the training wearable computing device.

10. The wearable computing device of claim 1, wherein:
the training kinematic data is collected at a plurality of training wearable computing devices including the training wearable computing device; and
the plurality of training wearable computing devices each have the second IMU mounting location.

11. The wearable computing device of claim 1, wherein:
the training kinematic data is collected at a plurality of training wearable computing devices including the training wearable computing device;
the plurality of training wearable computing devices have a plurality of differing IMU mounting locations; and
training the first machine learning model further includes transforming the training kinematic data collected at each of the plurality of training wearable computing devices into the training coordinate frame.

12. A method for use with a wearable computing device, the method comprising:

while a device body of the wearable computing device is affixed to a body of a user, receiving kinematic data from an inertial measurement unit (IMU), wherein:
the IMU includes an accelerometer and a gyroscope coupled to the device body at a first IMU mounting location; and
the kinematic data is expressed in a runtime coordinate frame;

performing a first coordinate transformation on the kinematic data from the runtime coordinate frame into a training coordinate frame of a training wearable computing device to obtain transformed kinematic data, wherein the training wearable computing device has a second device body with a second IMU mounting location that differs from the first IMU mounting location;

at a first machine learning model trained using training data including training kinematic data collected at a training IMU of the training wearable computing device, computing a training-frame velocity estimate for the wearable computing device based at least in part on the transformed kinematic data;

performing a second coordinate transformation on the training-frame velocity estimate from the training coordinate frame into the runtime coordinate frame to obtain a runtime-frame velocity estimate for the wearable computing device; and outputting the runtime-frame velocity estimate to a target program.

13. The method of claim 12, wherein performing the first coordinate transformation includes:

computing a plurality of calibration parameters for the wearable computing device;

computing a plurality of runtime correction parameters for the wearable computing device based on the kinematic data; and computing the first coordinate transformation as specified by the plurality of calibration parameters and the plurality of runtime correction parameters.

14. The method of claim 13, wherein the plurality of calibration parameters include a translational mounting pose offset between the second IMU mounting location and the first IMU mounting location and a rotational mounting pose offset between the runtime coordinate frame and the training coordinate frame.

15. The method of claim 13, wherein the plurality of runtime correction parameters include an angular velocity correction parameter, an angular acceleration correction parameter, and a runtime world-frame orientation of the IMU relative to a world frame.

16. The method of claim 15, wherein computing the plurality of runtime correction parameters includes applying a Kalman filter to the kinematic data.

17. The method of claim 12, wherein the training data further includes a plurality of ground-truth velocity measurements collected for the training wearable computing device.

18. The method of claim 12, further comprising:
while the device body is affixed to the body of the user, receiving additional kinematic data from an additional IMU included in the wearable computing device; and
computing the angular acceleration correction parameter based at least in part on the additional kinematic data.

19. The method of claim 12, wherein:
the training kinematic data is collected at a plurality of training wearable computing devices including the training wearable computing device;
the plurality of training wearable computing devices have a plurality of differing IMU mounting locations; and
training the first machine learning model further includes transforming the training kinematic data collected at each of the plurality of training wearable computing devices into the training coordinate frame.

20. A wearable computing device comprising:
a device body configured to be affixed to a body of a user;
an inertial measurement unit (IMU) including an accelerometer and a gyroscope coupled to the device body at a first IMU mounting location; and
a processor electronically coupled to the IMU, wherein the processor is configured to:
while the device body is affixed to the body of the user, receive kinematic data from the IMU, the kinematic data being in a runtime coordinate frame;
compute a plurality of calibration parameters for the wearable computing device, wherein the plurality of calibration parameters include a translational mounting pose offset between the second IMU mounting location and the first IMU mounting location and a rotational mounting pose offset between the runtime coordinate frame and the training coordinate frame;
compute a plurality of runtime correction parameters for the wearable computing device based on the kinematic data, wherein the plurality of runtime correction parameters include an angular velocity correction parameter, an angular acceleration correction parameter, and a runtime world-frame orientation of the IMU relative to a world frame;
perform a first coordinate transformation, as specified by the plurality of calibration parameters and the plurality of runtime correction parameters, on the kinematic data from the runtime coordinate frame into a training coordinate frame of a training wearable computing device to obtain transformed kinematic data, wherein the training wearable computing device has a second device body with a second IMU mounting location that differs from the first IMU mounting location;
at a first machine learning model trained using training data including training kinematic data collected at a training IMU of the training wearable computing device, compute a training-frame velocity estimate for the wearable computing device based at least in part on the transformed kinematic data;
perform a second coordinate transformation on the training-frame velocity estimate from the training coordinate frame into the runtime coordinate frame to obtain a runtime-frame velocity estimate for the wearable computing device; and
output the runtime-frame velocity estimate to a target program.

* * * * *